(12) United States Patent
Sugishima et al.

(10) Patent No.: US 10,493,940 B2
(45) Date of Patent: Dec. 3, 2019

(54) SIDE AIRBAG DEVICE

(71) Applicant: TOYOTA JIDOSHA KABUSHIKI KAISHA, Toyota-shi, Aichi-ken (JP)

(72) Inventors: Takeharu Sugishima, Chiryu (JP); Osamu Fukawatase, Miyoshi (JP); Takamichi Komura, Okazaki (JP); Takayuki Shimizu, Tsukuba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 16/008,489

(22) Filed: Jun. 14, 2018

(65) Prior Publication Data
US 2019/0047504 A1 Feb. 14, 2019

(30) Foreign Application Priority Data

Aug. 9, 2017 (JP) .................. 2017-153954

(51) Int. Cl.
*B60R 21/207* (2006.01)
*B60R 21/231* (2011.01)
*B60R 21/00* (2006.01)

(52) U.S. Cl.
CPC ...... *B60R 21/207* (2013.01); *B60R 21/23138* (2013.01); *B60R 2021/0006* (2013.01); *B60R 2021/23107* (2013.01); *B60R 2021/23146* (2013.01)

(58) Field of Classification Search
CPC ............ B60R 21/207; B60R 21/23138; B60R 2021/0006; B60R 2021/23107; B60R 2021/23146
See application file for complete search history.

(56) References Cited

U.S. PATENT DOCUMENTS

| | | | | | |
|---|---|---|---|---|---|
| 5,575,497 | A | * | 11/1996 | Suyama | B60R 21/231 280/730.1 |
| 7,048,300 | B2 | * | 5/2006 | Honda | B60R 21/23138 280/730.2 |
| 7,594,678 | B2 | * | 9/2009 | Schedler | B60R 21/23138 280/729 |

(Continued)

FOREIGN PATENT DOCUMENTS

| | | | |
|---|---|---|---|
| DE | 102009016885 A1 | | 10/2010 |
| DE | 102009021635 A1 | * | 11/2010 ........... B60R 21/207 |

(Continued)

*Primary Examiner* — Faye M Fleming
(74) *Attorney, Agent, or Firm* — Oliff PLC

(57) ABSTRACT

There is provided a side airbag device including: a first side airbag being provided inside a side section at a seat width direction outer side of a seatback and inflated and deployed at a side of an occupant seated in a seat; a second side airbag being arranged at a seat width direction inner side of the first side airbag so as to inflate and deploy between the first side airbag and the occupant; a communication section that places the first side airbag and the second side airbag in communication with each other; and a gas generation device, the gas generation device being provided at the communication section, and including a first gas emission section to supply gas into the first side airbag, and a second gas emission section that is separate from the first gas emission section to supply gas into the second side airbag.

9 Claims, 5 Drawing Sheets

(56) References Cited

U.S. PATENT DOCUMENTS

| | | | |
|---|---|---|---|
| 7,641,228 B2* | 1/2010 | Mansson | B60R 21/21 280/730.2 |
| 8,596,675 B2* | 12/2013 | Kwon | B60R 21/233 280/729 |
| 8,651,515 B2* | 2/2014 | Baba | B60R 21/233 280/729 |
| 9,016,718 B2* | 4/2015 | Fukawatase | B60R 21/233 280/730.2 |
| 9,027,957 B2* | 5/2015 | Baba | B60R 21/23138 280/729 |
| 9,108,587 B2* | 8/2015 | Rickenbach | B60R 21/231 |
| 9,937,890 B2* | 4/2018 | Wipasuramonton | B60R 21/233 |
| 10,173,631 B2* | 1/2019 | Perez Garcia | B60R 21/23138 |
| 10,377,337 B2* | 8/2019 | Kunisada | |
| 2006/0196715 A1* | 9/2006 | Fujishiro | B60N 2/0276 180/271 |
| 2009/0020988 A1 | 1/2009 | Sato et al. | |
| 2010/0090448 A1* | 4/2010 | Pursche | B60R 21/0134 280/730.2 |
| 2018/0186326 A1* | 7/2018 | Kobayashi | B60R 21/23138 |
| 2018/0222435 A1 | 8/2018 | Fukawatase et al. | |
| 2019/0084516 A1* | 3/2019 | Fukawatase | B60R 21/207 |
| 2019/0161052 A1* | 5/2019 | Steiner | B60R 21/233 |
| 2019/0256038 A1* | 8/2019 | Rathgeb | B60R 21/23138 |

FOREIGN PATENT DOCUMENTS

| | | |
|---|---|---|
| JP | 2008-87631 A | 4/2008 |
| JP | 2009-23494 A | 2/2009 |
| JP | 2014-80169 A | 5/2014 |
| JP | 2018-122812 A | 8/2018 |

* cited by examiner

SIDE AIRBAG DEVICE

CROSS-REFERENCE TO RELATED APPLICATION

This application is based on and claims priority under 35 USC 119 from Japanese Patent Application No. 2017-153954 filed on Aug. 9, 2017, the disclosure of which is incorporated by reference herein.

BACKGROUND

Technical Field

The present disclosure relates to a side airbag device.

Related Art

For a side airbag device that inflates and deploys at the side of an occupant seated in a seat, Japanese Patent Application Laid-Open (JP-A) No. 2008-87631 discloses a structure including a main inflation section (first airbag) to inflate and deploy between the occupant and a sidewall section of a cabin interior, and an auxiliary inflation section (second airbag) to press and displace the occupant toward the inside of a vehicle. The side airbag device of JP-A No. 2008-87631 has a structure in which a gas generation device (inflator) to supply gas to the main inflation section and a gas generation device to supply gas to the auxiliary inflation section are separately provided. These inflation sections inflate at different timings to inflate the airbag.

In addition to that of JP-A No. 2008-87631, other known structures for side airbag devices to inflate and deploy at the side of an occupant include the structures described in JP-A Nos. 2009-23494 and 2014-80169, and the specification of German Patent Application Publication No. 102009016885A1.

In the structure described in JP-A No. 2008-87631, the initial restraining performance during a side collision is improved by employing plural airbags. However, the number of components is increased due to there being a greater number of inflators. Moreover, a side frame of the seat needs to be reinforced to attach the plural inflators, and there is room for improvement from the perspectives of reducing the number of components, and weight reduction.

SUMMARY

In view of the above circumstances, the present disclosure provides a side airbag device in which a reduction in the number of components and a reduction in weight can be achieved while still ensuring initial restraining performance during a side collision.

A side airbag device according to a first aspect of the present disclosure includes a first side airbag, a second side airbag, a communication section, and a gas generation device. The first side airbag is provided inside a side section at a seat width direction outer side of a seatback and is inflated and deployed at a side of an occupant seated in a seat. The second side airbag is arranged at a seat width direction inner side of the first side airbag so as to inflate and deploy between the first side airbag and the occupant. The communication section places the first side airbag and the second side airbag in communication with each other. The gas generation device is provided at the communication section, and includes a first gas emission section to supply gas into the first side airbag, and a second gas emission section that is separate from the first gas emission section to supply gas into the second side airbag.

In the first aspect of the present disclosure, the first side airbag and the second side airbag are provided in the side section at the seat width direction outer side of the seatback. These two airbags are inflated and deployed during a side collision (when colliding). This enables an occupant to receive a reaction force from a side section (door trim) of a vehicle cabin at an earlier stage than with a structure in which the occupant is restrained by a single airbag alone, enabling the occupant to be pressed toward the seat width direction inner side at an earlier stage.

Moreover, the first side airbag and the second side airbag are in communication through the communication section, and the gas generation device is provided in the communication section. The gas generation device is equipped with the first gas emission section to supply gas into the first side airbag, and the second gas emission section to supply gas into the second side airbag. This enables both the first side airbag and the second side airbag to be inflated and deployed by actuating the single gas generation device. The number of components can in this manner be reduced in comparison to structures equipped with a gas generation device in each of the side airbags. Moreover, due to there being no need to increase the number of gas generation devices, there is no need to reinforce the side frame, and a weight reduction can be achieved.

The side airbag device according to a second aspect of the present disclosure is the first aspect, wherein the first gas emission section and the second gas emission section emit gas simultaneously.

Due to the first side airbag and the second side airbag being inflated and deployed simultaneously in the second aspect of the present disclosure, a gap between a side section of the vehicle cabin and the occupant can be filled at an early stage. Note that reference here to at the same timing is not limited to being strictly the same, and encompasses slightly asynchronous gas generation within a range that nevertheless enables the above advantageous effects to be exhibited.

The side airbag device according to a third aspect of the present disclosure is the first or second aspect, wherein a side frame configuring framework of the seatback is provided inside the side section. The side frame includes a sidewall section extending along a seat front-rear direction of the side frame in plan view, and a front wall section extending from a front edge of the sidewall section toward the seat width direction inner side in plan view. The gas generation device is attached to the front wall section.

In the third aspect of the present disclosure, due to the gas generation device being attached to the front wall section of the side frame, it is easier to attach the gas generation device than in structures such as those in which an inflator is attached to an inner face of the sidewall section. Namely, the number of operations required to assemble the gas generation device can be reduced.

The side airbag device according to a fourth aspect of the present disclosure is any one of the first to third aspects, wherein: the gas generation device is formed in a circular cylinder shape having an axial direction oriented in the seat width direction so as to span into the first side airbag and the second side airbag; the first gas emission section is formed at one axial direction end of the gas generation device and is positioned inside the first side airbag; and the second gas emission section is formed at another axial direction end of the gas generation device and is positioned inside the second side airbag.

In the fourth aspect of the present disclosure, gas is directly supplied from the first gas emission section into the first side airbag, and gas is directly supplied from the second gas emission section into the second side airbag. This enables the first side airbag and the second side airbag to be quickly inflated and deployed. Due to the gas emission sections being provided at the two axial direction ends of the gas generation device, the reaction forces acting on the gas generation device in the axial direction when gas is emitted are able to cancel each other out.

The side airbag device according to a fifth aspect of the present disclosure is any one of the first to third aspects, wherein: the gas generation device is formed in a circular cylinder shape having an axial direction oriented in a direction inclined with respect to the seat width direction when viewed along the seat front-rear direction so as to span into the first side airbag and the second side airbag; the first gas emission section is formed at one axial direction end of the gas generation device and is positioned inside the first side airbag; and the second gas emission section is formed at another axial direction end of the gas generation device and is positioned inside the second side airbag.

In the fifth aspect of the present disclosure, the gas generation device is provided with its axial direction oriented in a direction inclined with respect to the seat width direction. This enables a width of a side section (side support section) of the seatback to be made shorter that when the gas generation device is disposed with its axial direction in the seat width direction, enabling a more compact seat.

A side airbag device according to a sixth aspect of the present disclosure is the fifth aspect, wherein the gas generation device is disposed inclined with respect to the seat width direction such that the first gas emission section is at a position at a seat lower side of the second gas emission section.

In the sixth aspect of the present disclosure, due to the first gas emission section being disposed at a position at a seat lower side of the second gas emission section, gas flows preferentially to a lower portion of the first side airbag. This enables the portion corresponding to the hip region of the occupant to be made to inflate early, enabling a location having a higher load withstanding ability than the chest region or the belly region to be preferentially restrained.

A side airbag device according to a seventh aspect of the present disclosure is any one of the first to the sixth aspects, wherein the first side airbag extends to a seat lower side of the second side airbag, and a lower portion of the first side airbag is enlarged toward the seat width direction inner side so as to tuck under a lower side of the second side airbag.

In the seventh aspect of the present disclosure, due to the lower portion of the first side airbag being enlarged toward the seat width direction inner side, the gap between the first side airbag and the occupant can be reduced, enabling effective restraint of the occupant at the hip region or the like.

As explained above, the side airbag device according to the first aspect of the present disclosure exhibits the excellent advantageous effect of enabling a reduction in the number of components and a reduction in weight to be achieved while still ensuring initial restraining performance during a side collision.

The side airbag device according to the second aspect of the present disclosure exhibits the excellent advantageous effect of enabling the initial restraining performance to be improved.

The side airbag device according to the third aspect of the present disclosure exhibits the excellent advantageous effect of being able to improve the ease of assembly of the gas generation device.

The side airbag device according to the fourth aspect of the present disclosure exhibits the excellent advantageous effect of being able to improve the initial restraining performance, while also enabling a good attachment state of the gas generation device to be maintained.

The side airbag device according to the fifth aspect of the present disclosure exhibits the excellent advantageous effect of enable a seat to be made more compact.

The side airbag device according to the sixth aspect of the present disclosure exhibits the excellent advantageous effect of enabling the occupant to be restrained in a manner that matches the load withstanding ability of the occupant.

The side airbag device according to the seventh aspect of the present disclosure exhibits the excellent advantageous effect of enabling occupant restraining performance to be improved.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
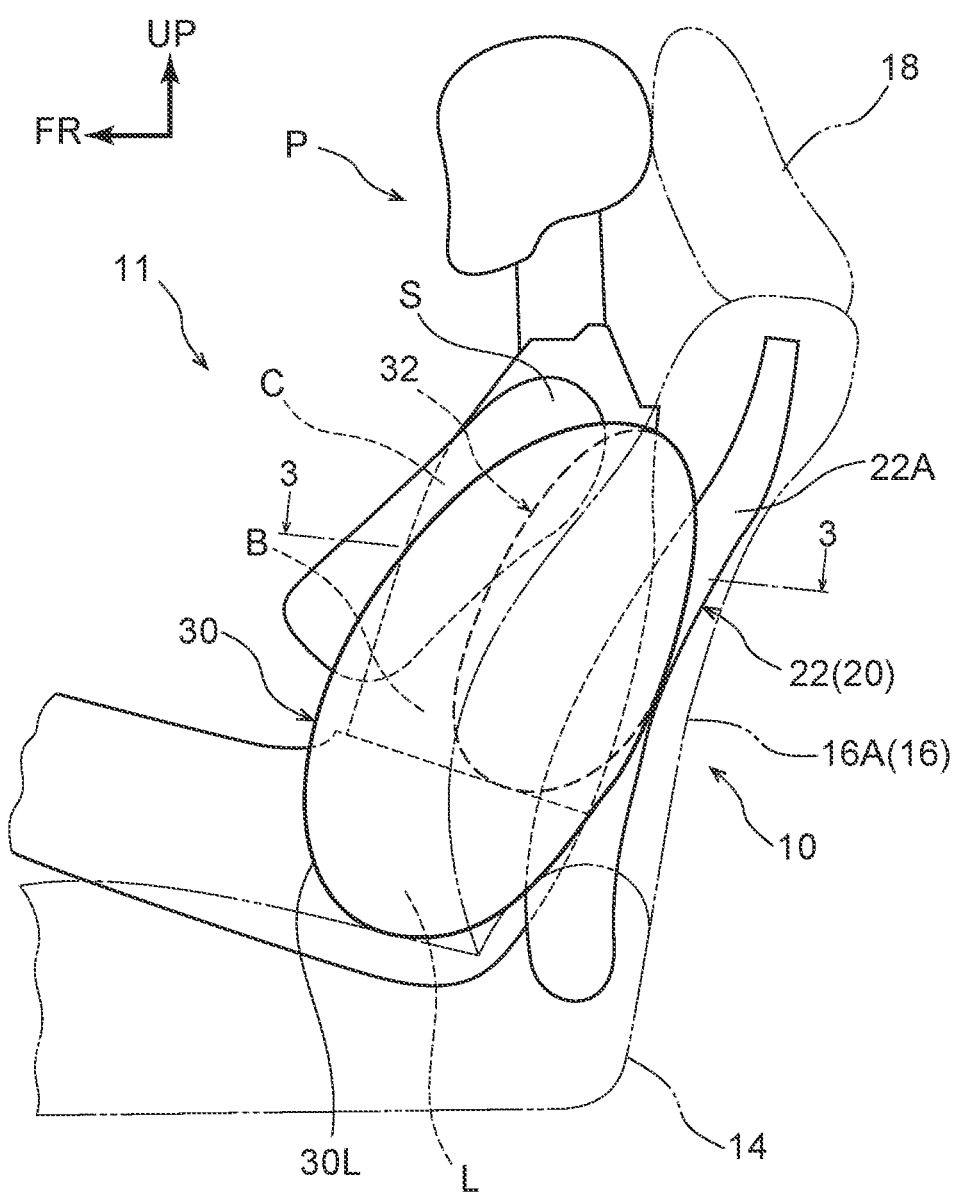
FIG. 1 is a side view of a side airbag device according to a first exemplary embodiment as viewed from a width direction outer side of a vehicle, and illustrates an actuated state when the side airbag device has been actuated.
Figure 2:
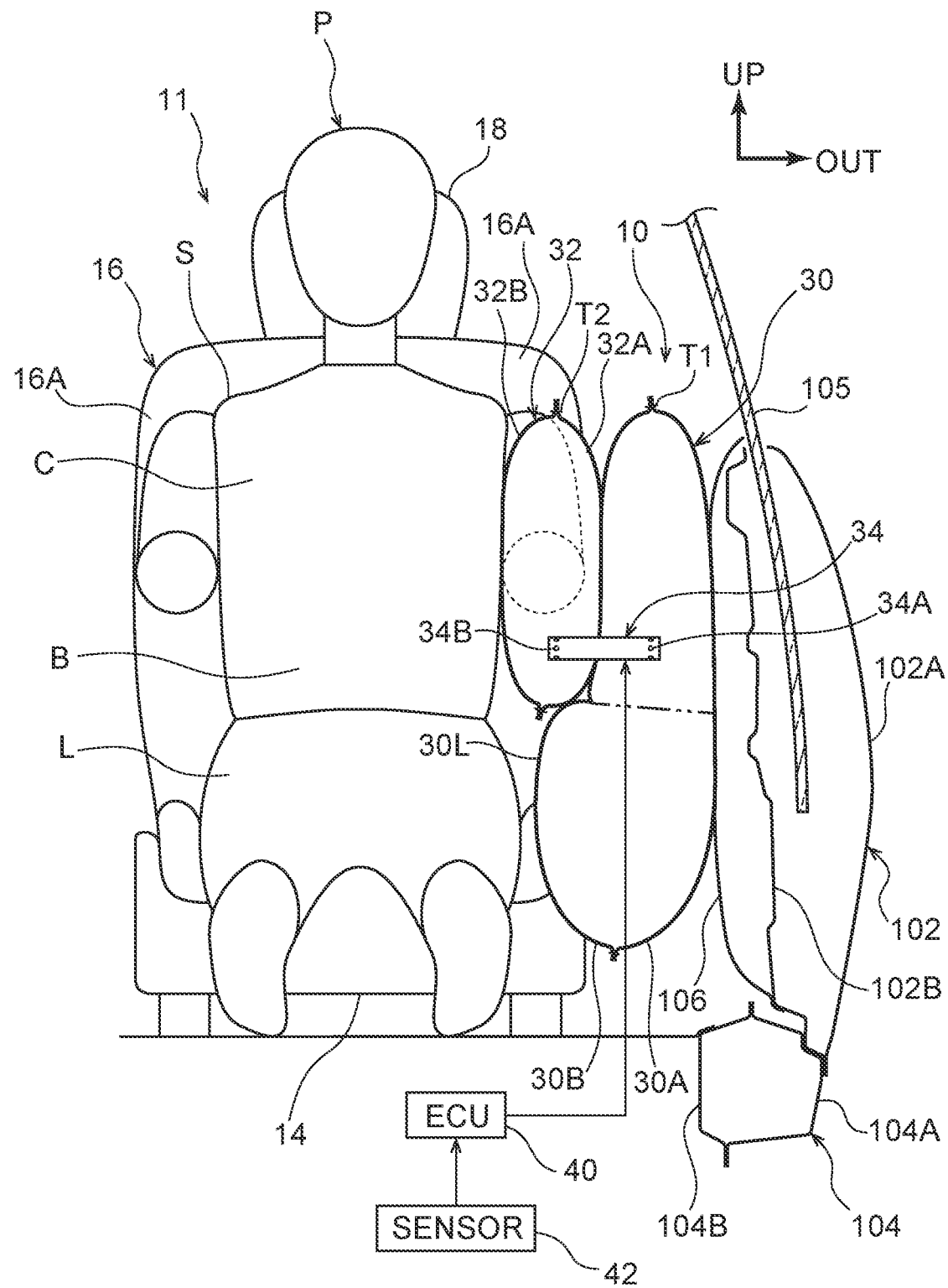
FIG. 2 is a front view of a side airbag device according to the first exemplary embodiment as viewed from a vehicle front side, and illustrates an actuated state when the side airbag device has been actuated.
Figure 3:
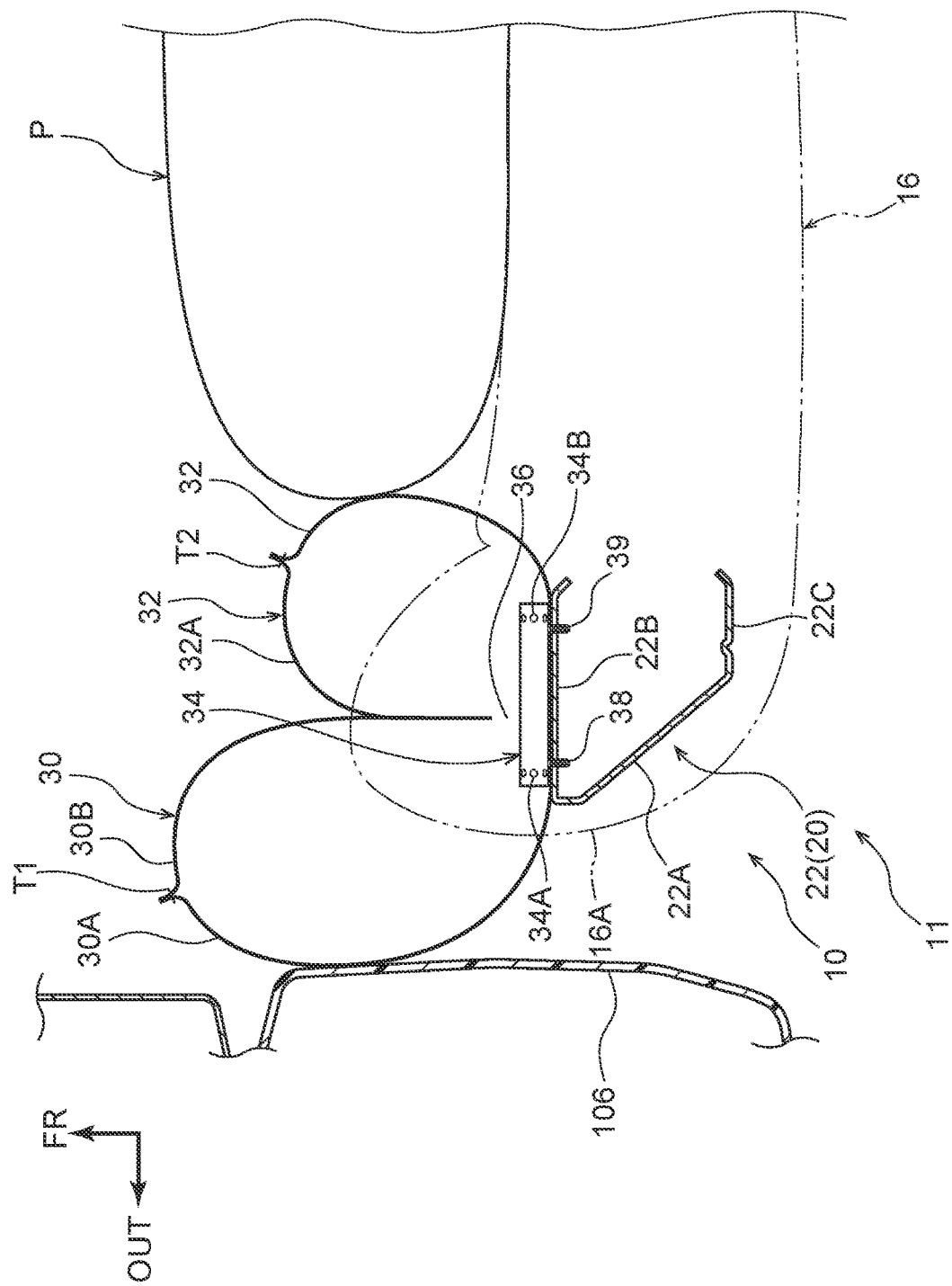
FIG. 3 is an enlargement of a cross-section taken along line 3-3 in FIG. 1.

Explanation follows regarding a side airbag device according to a first exemplary embodiment of the present disclosure, with reference to FIG. 1 to FIG. 3. Note that in the drawings, the arrows FR, the arrows UP, and the arrows OUT respectively indicate a forward direction (direction of travel), upward direction, and an outward direction in a width direction of a vehicle. Unless stated otherwise, references simply to front and rear, left and right, and vertical directions below indicate the front and rear in the vehicle front-rear direction, the left and right in the vehicle left-right direction (vehicle width direction), and up and down in the vehicle vertical direction.

Overall Configuration of Vehicle Seat 11

As illustrated in FIG. 1, a vehicle seat 11 installed with a side airbag device 10 according to the present exemplary embodiment includes a seat cushion 14, a seatback 16 coupled to a rear edge of the seat cushion 14 so as to be capable of reclining, and a headrest 18 coupled to an upper edge of the seatback 16. Side supports 16A are also provided as side sections at both sides in the seat width direction of the seatback 16 of the vehicle seat 11. The side airbag device 10 is installed in one of the side supports 16A. This vehicle seat 11 is, for example, a driver seat in a left-hand drive vehicle, or a front passenger seat in a right-hand drive vehicle, and is disposed on the left in a vehicle cabin. The front-rear direction, left-right direction (width direction) and the vertical direction of the vehicle seat 11 are aligned with the front-rear direction, left-right direction (width direction) and the vertical direction of the vehicle. The vehicle seat 11 would have a left-right symmetrical configuration to that of the present exemplary embodiment were it to be disposed on the right in the vehicle cabin.

In the drawings there is a crash test dummy P seated in the vehicle seat 11 in place of an actual occupant. The dummy P is an American adult 50 percentile (AM50) World Side Impact Dummy (World SID). The dummy P is seated in the vehicle seat 11 by the seating method prescribed for side collision tests, and the front-rear position of the seatback 16 in the vehicle and an inclination angle of the seatback 16 with respect to the seat cushion 14 are adjusted so as to be set at the reference positions corresponding to the above seating method. The dummy P is sometimes referred to below as "occupant P".

The seatback 16 of the vehicle seat 11 includes a seatback frame 20, a seatback pad (not illustrated in the drawings) fitted to the seatback frame 20, and a seatback cover (not illustrated in the drawings) covering the seatback pad.

The seatback frame 20 is formed, for example, from metal and configures framework of the seatback 16. The seatback frame 20 is configured including a left and right pair of side frames 22 (only the side frame 22 on the left of the seat is illustrated in FIG. 1). The side frames 22 each extend along the vertical direction of the seatback 16 inside the side supports 16A at the two seat width direction sides of the seatback 16. The seatback frame 20 includes an upper frame, not illustrated in the drawings, connecting upper ends of the pair of side frames 22 together in the seat width direction, and a lower frame, not illustrated in the drawings, connecting lower ends of the pair of side frames 22 together in the seat width direction.

As illustrated in FIG. 3, the side frames 22 each have a configuration, when viewed in a horizontal cross-section of the seatback 16, including a sidewall section 22A extending in the vehicle front-rear direction, a front wall section 22B extending from a front edge of the sidewall section 22A toward the vehicle width direction inner side (seat width direction inner side), and a rear wall section 22C extending from a rear edge of the sidewall section 22A toward the vehicle width direction inner side. The sidewall section 22A is inclined such that a seat rear side of the sidewall section 22A is positioned further to the seat width direction inner side than the seat front side of the sidewall section 22A. The front wall section 22B is formed so as to be longer than the rear wall section 22C in the seat width direction. An inflator 34 is attached to the front wall section 22B and serves as a gas generation device, described later.

As illustrated in FIG. 2, a side door 102 is disposed at the vehicle width direction outer side of the vehicle seat 11. The side door 102 has a closed cross-section structure that includes a door outer panel 102A at the vehicle outer side and a door inner panel 102B at the vehicle inner side. A side window glass 105 is provided between the door outer panel 102A and the door inner panel 102B so as to be capable of sliding in the vehicle vertical direction. Door trim 106 is provided at the vehicle inner side of the door inner panel 102B. The door trim 106 is interior trimming configuring a side section of the vehicle cabin.

A rocker 104 is disposed below the side door 102. The rocker 104 is a vehicle framework member. The rocker 104 extends along the vehicle front-rear direction, and has a closed cross-section structure configured by joining together a rocker outer panel 104A at the vehicle outer side, and a rocker inner panel 104B at the vehicle inner side. The side door 102 is supported from the vehicle inner side by the rocker 104, and is capable of swinging toward the vehicle outer side through a hinge, not illustrated in the drawings. The side airbag device 10 of the present exemplary embodiment is housed inside the side support 16A on the seat left side of the vehicle seat 11, near to the side door 102.

Configuration of the Side Airbag Device 10

The side airbag device 10 is configured including an outer airbag 30 serving as a first side airbag, an inner airbag 32 serving as a second side airbag, and the inflator 34. Note that the outer airbag 30 and the inner airbag 32 are modularized and housed inside the side support 16A in a non-actuated state (normally) prior to the side airbag device 10 being actuated.

The outer airbag 30 is, for example, an elongated bag formed with its length direction along the seat vertical direction by overlapping an outer base cloth 30A and an inner base cloth 30B, which are cut out from a nylon-based or polyester-based material, and stitching outer peripheral edges of the outer base cloth 30A and the inner base cloth 30B together along a seam T1. In the present exemplary embodiment, the outer base cloth 30A configures a seat width direction outer surface of the outer airbag 30 when in an inflated and deployed state, and the inner base cloth 30B configures a seat width direction inner surface of the outer airbag 30 when in the inflated and deployed state. The outer base cloth 30A and the inner base cloth 30B are formed with similar sizes and shapes to each other.

The outer airbag 30 inflates and deploys at the side of the occupant P seated in the vehicle seat 11. More specifically, the outer airbag 30 inflates and deploys between the door trim 106 of the side door 102 and the occupant P.

The outer airbag 30 extends to the seat lower side of the inner airbag 32, described later. In the present exemplary embodiment, the outer airbag 30 extends in the seat vertical direction from a shoulder region S of the occupant P to a hip region L of the occupant P. A lower portion 30L of the outer airbag 30 is enlarged toward the seat width direction inner side, so as to tuck under a lower side of the inner airbag 32.

The inner airbag 32 is arranged at the seat width direction inner side of the outer airbag 30. The inner airbag 32 is, for example, an elongated bag that is formed by overlapping an outer base cloth 32A and an inner base cloth 32B, cut out from a nylon-based or polyester-based material, and stitching outer peripheral edges of the outer base cloth 30A and the inner base cloth 30B together around a seam T2. In the present exemplary embodiment, the outer base cloth 32A configures a seat width direction outer surface of the inner airbag 32 when in the inflated and deployed state, and the inner base cloth 32B configures a seat width direction inner surface of the inner airbag 32 when in the inflated and deployed state. The outer base cloth 32A and the inner base cloth 32B are formed with similar sizes and shapes to each other.

The inner airbag 32 extends in the seat vertical direction from the shoulder region S of the occupant P to a belly region B of the occupant P, and inflates and deploys between the outer airbag 30 and the output.

Note that the method of manufacturing the outer airbag 30 (and the inner airbag 32) is not limited to that described above, and may be modified as appropriate. For example, the outer airbag 30 (and the inner airbag 32) may be manufactured by folding a single sheet of base cloth in two, and stitching together outer peripheral edges thereof. Moreover, the outer airbag 30 (and the inner airbag 32) may be manufactured with an automatic loom using a one piece woven (OPW) method.

As illustrated in FIG. 3, a communication section 36 is formed at a boundary portion between the outer airbag 30 and the inner airbag 32, placing the outer airbag 30 and the inner airbag 32 in communication with each other. The communication section 36 of the present exemplary embodiment is configured by a communication hole that communicates a base end portion of the outer airbag 30 with a base end portion of the inner airbag 32. The inflator 34 is provided to the communication section 36.

The inflator 34 is what is referred to as a cylinder type of inflator, and is formed in a circular column shape attached to the front wall section 22B of the side frame 22. The inflator 34 has its axial direction (length direction) running along the seat width direction, and is disposed so as to span into the outer airbag 30 and the inner airbag 32. One axial direction end of the inflator 34 at the seat width direction outer side is thereby positioned in the interior space of the outer airbag 30, and the other axial direction end of the inflator 34 at the seat width direction inner side is thereby positioned in the interior space of the inner airbag 32.

A stud bolt 38 projects out toward the seat rear side from an outer peripheral portion at one axial direction end of the inflator 34, and a stud bolt 39 projects out toward the seat rear side from an outer peripheral portion at another axial direction end of the inflator 34. The stud bolts 38, 39 pass through the front wall section 22B, and nuts, not illustrated in the drawings, are screwed onto the stud bolts 38, 39 at the back face (seat rear side) of the front wall section 22B. The inflator 34 is thereby fastened so as to be fixed to the side frame 22.

A first gas emission section 34A is provided at a seat width direction outer end (one axial direction end) of the inflator 34. The first gas emission section 34A includes plural gas ejection ports, and has a configuration such that gas is ejected from the gas ejection ports when the inflator 34 is actuated. The first gas emission section 34A is positioned inside the outer airbag 30. When the inflator 34 is actuated, gas is supplied from the first gas emission section 34A to the outer airbag 30.

A second gas emission section 34B is provided, separately to the first gas emission section 34A, at a seat width direction inner side end (other axial direction end) of the inflator 34. The second gas emission section 34B includes plural gas ejection ports, and has a configuration such that gas is ejected from the gas ejection ports when the inflator 34 is actuated. The second gas emission section 34B is positioned inside the inner airbag 32. When the inflator 34 is actuated, gas is supplied from the second gas emission section 34B to the inner airbag 32.

The first gas emission section 34A and the second gas emission section 34B are each equipped with an ignition agent (initiator). Namely, the inflator 34 of the present exemplary embodiment is what is referred to as a dual inflator equipped with plural ignition agents. Note that in the example of the present exemplary embodiment, the volume of gas supplied from the first gas emission section 34A to the outer airbag 30 and the volume of gas supplied from the second gas emission section 34B to the inner airbag 32 are adjusted according to the respective capacities of the airbags. The internal pressures of the outer airbag 30 and the inner airbag 32 are substantially the same internal pressure when in inflated and deployed states. However there is no limitation thereto, and the volume of gas may be adjusted such that different internal pressures are obtained.

As illustrated in FIG. 2, the inflator 34 is disposed at a seat vertical direction central portion of the outer airbag 30, and at a height of a lower end portion of the inner airbag 32. Thus gas emitted from the first gas emission section 34A is supplied into the seat vertical direction central portion of the outer airbag 30, and flows upward and downward so as to inflate and deploy the outer airbag 30. The gas emitted from the second gas emission section 34B is supplied into the lower end portion of the inner airbag 32, and flows upward so as to inflate and deploy the inner airbag 32. Note that for ease of explanation the inflator 34 is drawn with an exaggerated size in FIG. 2. The inflator 34 has an actual size that can be accommodated inside the side support 16A (inside the seatback 16).

A side impact ECU 40 installed in the vehicle is electrically connected to the inflator 34. A sensor 42 for detecting a side collision is electrically connected to the side impact ECU 40. The side impact ECU 40 is configured to actuate the inflator 34 when a side collision is detected based on the output of the sensor 42. The sensor 42 has, for example, a configuration including a pressure sensor or acceleration sensor arranged inside a front side-door or a rear side-door (in-door sensors), and an acceleration sensor arranged inside a B pillar (in-pillar sensor).

In the present exemplary embodiment, the ignition agent of the first gas emission section 34A and the ignition agent of the second gas emission section 34B are ignited at the same timing when the inflator 34 is actuated. Thus configuration is such that gas is emitted at the same timing from the first gas emission section 34A and the second gas emission section 34B.

Note that when a collision prediction sensor (pre-crash sensor) that predicts (forecasts) a side collision is electrically connected to the side impact ECU 40, a configuration may be adopted in which the inflator 34 is actuated when a side collision is predicted by the side impact ECU 40 based on a signal from the collision prediction sensor. Such a collision prediction sensor may, for example, be configured by application of at least one of milliwave radar, a stereo camera, or an infrared laser capable of monitoring in front and to the side of the vehicle.

Operation and Advantageous Effects

Explanation follows regarding operation and advantageous effects of the present exemplary embodiment.

In the side airbag device 10 of the present exemplary embodiment, the outer airbag 30 and the inner airbag 32 are provided inside the side support 16A. The two airbags are inflated and deployed in a side collision (in a side impact). The occupant P thereby receives a reaction force from the door trim 106 at an earlier stage than with a structure in which the occupant P is restrained by a single airbag alone, enabling the occupant P to be pressed toward the seat width direction inner side at an earlier stage.

Moreover, in the present exemplary embodiment, the communication section 36 communicates the outer airbag 30 and the inner airbag 32, and the inflator 34 is provided in the communication section 36. The inflator 34 is a dual inflator equipped with the first gas emission section 34A to supply gas into the outer airbag 30 and the second gas emission section 34B to supply gas into the inner airbag 32. This enables both the outer airbag 30 and the inner airbag 32 to be inflated and deployed by actuating the single inflator 34. This thereby enables the number of components to be reduced in comparison to a structure provided with an inflator for each of the airbags. Moreover, the side frame 22 does not need to be reinforced due to an increased number of inflators not needing to be attached to the side frame 22, enabling a reduction in weight to be achieved. Thus, the side airbag device 10 of the present exemplary embodiment enables the number of components to be reduced and a reduction in weight to be achieved while still ensuring initial restraining performance in a side collision.

Moreover, in the present exemplary embodiment, the outer airbag 30 and the inner airbag 32 are inflated and deployed at the same timing, and so the gap between the door trim 106, which is a side section of the vehicle cabin, and the occupant can be filled at an early stage. This enables the initial restraining performance to be improved.

Moreover, in the present exemplary embodiment, due to the inflator 34 being attached to the front wall section 22B of the side frame 22, attachment of the inflator 34 is easier than in structures in which the inflator 34 is attached to an inner face of the sidewall section 22A or the like. Namely, the number of operations required to assemble the inflator 34 can be reduced, enabling the ease of assembly of the inflator 34 to be improved.

Furthermore, in the present exemplary embodiment, gas is supplied from the first gas emission section 34A directly into the outer airbag 30, and gas is supplied from the second gas emission section 34B directly into the inner airbag 32. This enables the outer airbag 30 and the inner airbag 32 to be quickly inflated and deployed. Due to the gas emission sections being provided at the two axial direction ends of the inflator 34, the reaction forces acting on the inflator 34 in the axial direction when gas is emitted are able to cancel each other out. Namely, the initial restraining performance can be improved, while also enabling a good attachment state of the inflator 34 to be maintained.

Moreover, in the present exemplary embodiment, the lower portion 30L of the outer airbag 30 is enlarged toward the seat width direction inner side. This enables the gap between the lower portion 30L of the outer airbag 30 and the occupant P to be reduced, and enables effective restraint of the occupant P by the lower portion 30L of the outer airbag 30 at the hip region L or the like where the occupant P has a higher load withstanding ability than at a chest region C or a belly region B.

Note that although the sizes of the outer airbag 30 and the inner airbag 32 differ from each other in the present exemplary embodiment as illustrated in FIG. 3, with the outer airbag 30 being formed with the largest size, there is no limitation thereto. For example, a structure of a modified example as illustrated in FIG. 4 may be adopted.

Modified Example

Figure 4:
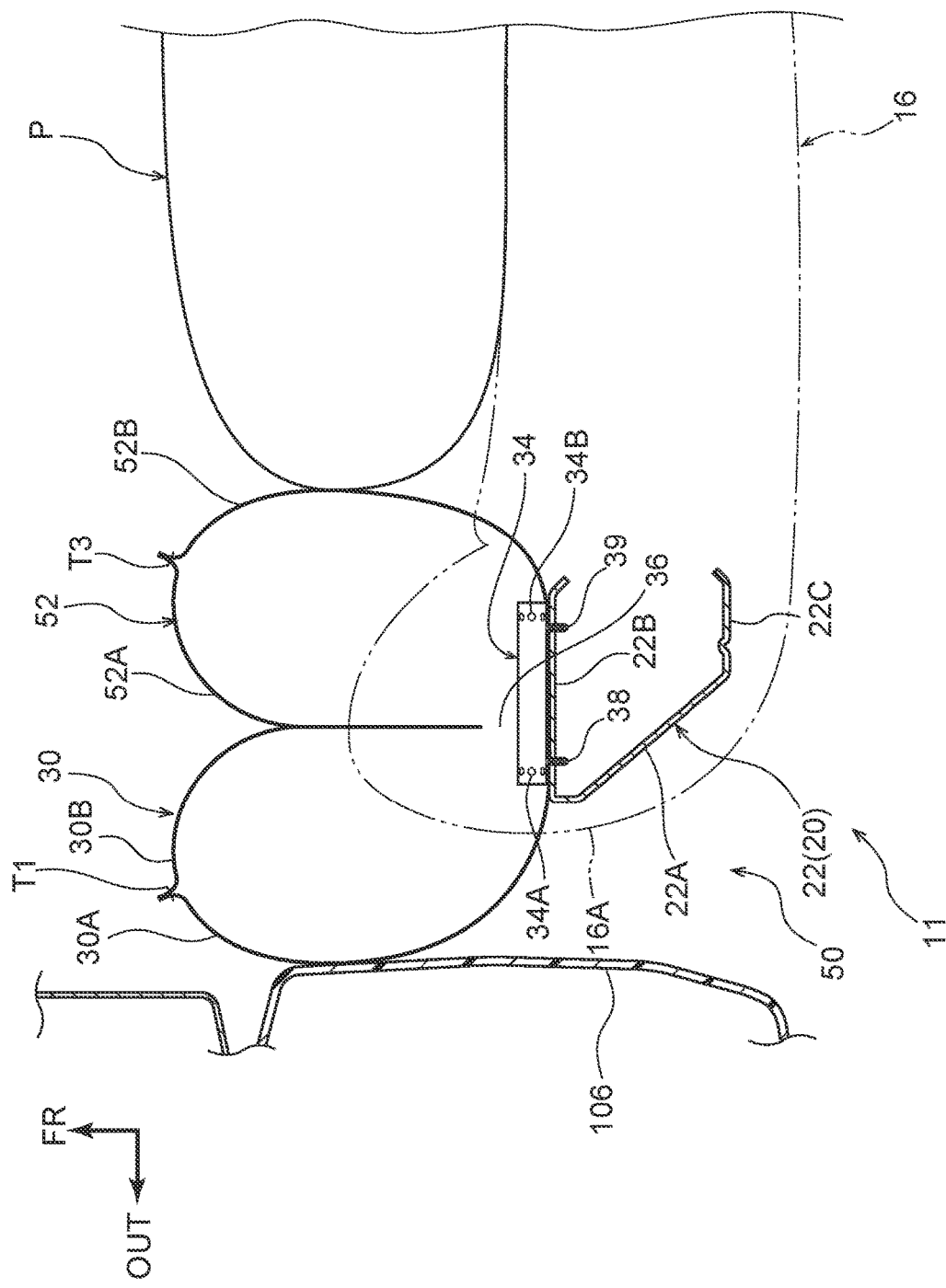
FIG. 4 is an enlarged cross-section corresponding to FIG. 3 and illustrating a side airbag device according to a modified example of the first exemplary embodiment.

As illustrated in FIG. 4, an inner airbag 52 configuring a side airbag device 50 of the present modified example is formed as an elongated bag having its length direction along the seat vertical direction. The inner airbag 52 is, for example, formed by overlapping an outer base cloth 52A and an inner base cloth 52B, which are cut out from a nylon-based or polyester-based material, and stitching outer peripheral edges of the outer base cloth 52A and the inner base cloth 52B together around a seam T3.

The outer base cloth 52A configures a seat width direction outer surface of the inner airbag 52 when in an inflated and deployed state, and is formed with a similar size to an outer base cloth 30A of an outer airbag 30. The inner base cloth 52B configures a seat width direction inner surface of the inner airbag 52 when in the inflated and deployed state, and is formed with a similar size to an inner base cloth 30B of an outer airbag 30. Namely, in the present modified example, the outer airbag 30 and the inner airbag 52 are formed with similar sizes.

Note that the inner airbag 52 extends in the seat vertical direction from a shoulder region S of the occupant P to a belly region B of the occupant P, similarly to the inner airbag 32 illustrated in FIG. 2. Thus the side airbag device 50 of the modified example has similar advantageous effects to those of the side airbag device 10 of the first exemplary embodiment.

Second Exemplary Embodiment

Figure 5:
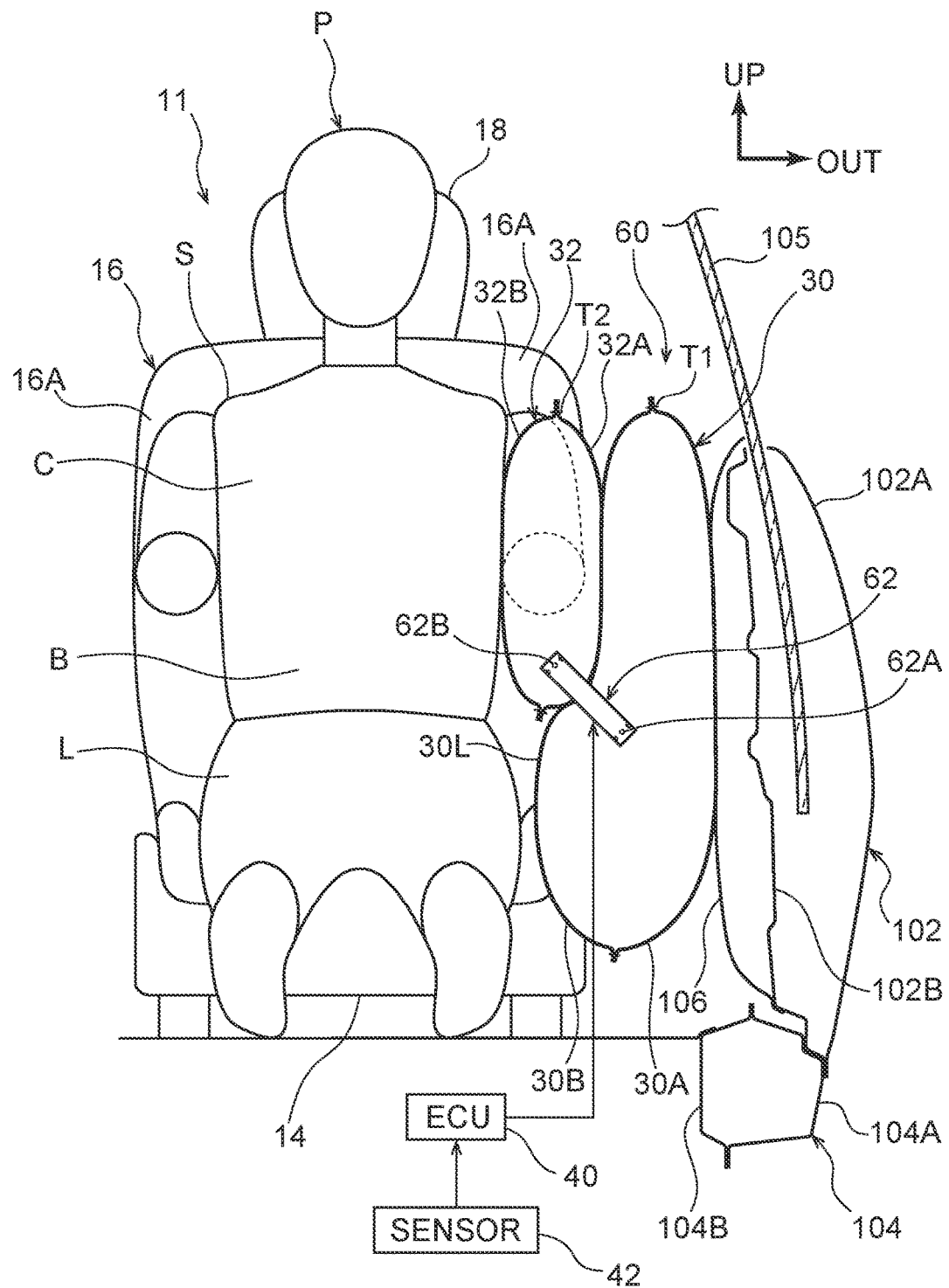
FIG. 5 is a front view corresponding to FIG. 2 and illustrating a side airbag device according to a second exemplary embodiment.

Explanation follows regarding a second exemplary embodiment of the present disclosure, with reference to FIG. 5. Note that configuration and operation that is basically the same as that of the first exemplary embodiment is appended with the same reference numerals as in the first exemplary embodiment, and explanation thereof is omitted.

A side airbag device 60 according to the present exemplary embodiment has a structure similar to that of the first exemplary embodiment, except with regard to an inflator 62, serving as a gas generation device. Namely, the side airbag device 60 is configured including an outer airbag 30, an inner airbag 32, and the inflator 62. Note that the outer airbag 30 and the inner airbag 32 are modularized and housed inside the side support 16A in a non-actuated state (normally) prior to the side airbag device 10 being actuated.

The inflator 62 is what is referred to as a cylinder type of inflator, and is formed in a circular column shape and attached to a front wall section of a side frame, similarly to in the first exemplary embodiment. Moreover, the axial direction (length direction) of the inflator 62 is disposed inclined with respect to the seat width direction when viewed along the seat front-rear direction, and is disposed so as to span into the outer airbag 30 and the inner airbag 32. In the present exemplary embodiment the axial direction of the inflator 62 is, for example, inclined at an acute angle to the seat vertical direction.

Moreover, the inflator 62 is what is referred to as a dual inflator equipped with a first gas emission section 62A and a second gas emission section 62B, with an ignition agent (initiator) provided in each of the gas emission sections.

The inflator 62 of the present exemplary embodiment is disposed inclined with respect to the seat width direction such that, when viewed along the seat front-rear direction, the first gas emission section 62A is at a position on the seat lower side of the second gas emission section 62B. One axial direction end of the inflator 62 at the seat width direction outer side is positioned in the interior space of the outer airbag 30, and the other axial direction end of the inflator 62 at the seat width direction inner side is positioned in the interior space of the inner airbag 32. Note that for ease of explanation the inflator 62 is drawn with an exaggerated size in FIG. 5. The inflator 62 has an actual size that can be accommodated inside the side support 16A (inside the seatback 16).

Operation and Advantageous Effects

Explanation follows regarding operation and advantageous effects of the present exemplary embodiment.

In the side airbag device 60 of the present exemplary embodiment, the inflator 62 is provided such that the axial direction of the inflator 62 is inclined with respect to the seat width direction. Thus, the width of the front wall section 22B of the side frame 22 (see FIG. 3) can be made narrower than in the first exemplary embodiment in which the axial direction of the inflator 34 is disposed along the seat width direction. As a result, the width of the side support 16A of the seatback 16 can be made narrower, enabling the vehicle seat 11 to be made more compact.

In particular, due to the first gas emission section 62A in the present exemplary embodiment being positioned at the seat lower side of the second gas emission section 62B, gas flows preferentially to the lower portion 30L of the outer airbag 30. The portion corresponding to the hip region L of the occupant P can accordingly be made to inflate early, enabling a location having high load withstanding ability to be preferentially restrained. This enables the occupant P to be restrained in a manner that matches the load withstanding ability of the occupant P. Other operation is similar to those of the first exemplary embodiment.

Although side airbag devices according to the first exemplary embodiment and the second exemplary embodiment have been explained, obviously various embodiments may be implemented in a range not departing from the spirit of the present disclosure. For example, although in the above exemplary embodiments the outer airbag 30 and the inner airbag 32 are each formed by a single bag-shaped body, there is no limitation thereto. The outer airbag 30 and the inner airbag 32 of the exemplary embodiment described above may each be partitioned by a partitioning cloth such as a tether. For example, a tether may be provided to partition the outer airbag 30 along the seat front-rear direction. By disposing the inflator 34 at the seat rear side of the tether, a higher internal pressure can be achieved at the place in the outer airbag 30 corresponding to a back region side of the occupant P, which has a high load withstanding ability, and a lower internal pressure can be achieved at the place in the outer airbag 30 corresponding to a chest region C and a belly region B of the occupant P. Moreover, a tether may be provided to partition the outer airbag 30 along the seat vertical direction. Furthermore, a tether may be provided that has a substantially L-shaped profile when viewed from a side face of the seat, so as to partition the outer airbag 30 into a chamber for restricting the back region side and the hip region L of the occupant P, and a chamber for restricting the belly region B and the chest region C of the occupant P.

The inflators 34, 62 in the above exemplary embodiments are dual inflators equipped with plural ignition agents, however there is no limitation thereto. For example, a structure may be adopted in which a single ignition agents is ignited to emit gas from the first gas emission section and the second gas emission section.

Moreover, although in the exemplary embodiment described above gas is emitted from the first gas emission section and the second gas emission section at the same timing, there is no limitation thereto. For example, in the first exemplary embodiment, the timing for supplying gas to the inner airbag 32 from the second gas emission section 34B may be set so as to be earlier than the timing for supplying gas to the outer airbag 30 from the first gas emission section 34A.

Furthermore, although the inflator 62 of the second exemplary embodiment is disposed inclined with respect to the seat width direction such that when viewed along the seat front-rear direction, the first gas emission section 62A is at a position on the seat lower side of the second gas emission section 62B, there is no limitation thereto. For example, in FIG. 5, the inflator 62 may be disposed inclined with respect to the seat width direction such that when viewed along the seat front-rear direction, the first gas emission section 62A is at a position on the seat upper side of the second gas emission section 62B. The inflator 62 may be inclined in such cases so as to incline toward the seat upper side on progression along the seat width direction toward the outer side. The seatback is wider at the seat upper side, and so the side frame is inclined toward the seat width direction outer side on progression toward the seat upper side, thus the inclination direction of the side frame is the same as the inclination direction of the inflator 62, enabling a more compact side support section to be designed.

In the exemplary embodiments described above, the communication section is a communication hole that communicates the outer airbag with the inner airbag, however, there is no limitation thereto. For example, a structure may be adopted in which the outer airbag and the inner airbag are coupled together through a tube shaped communication member or the like. In such cases, the communication member serves as the communication section of the present disclosure.

What is claimed is:

1. A side airbag device comprising:
    a first side airbag, the first side airbag being provided inside a side section at a seat width direction outer side of a seatback and inflated and deployed at a side of an occupant seated in a seat;
    a second side airbag, the second side airbag being arranged at a seat width direction inner side of the first side airbag so as to inflate and deploy between the first side airbag and the occupant;
    a communication section that places the first side airbag and the second side airbag in communication with each other; and
    a gas generation device, the gas generation device being provided at the communication section, and including a first gas emission section to supply gas into the first side airbag, and a second gas emission section that is separate from the first gas emission section to supply gas into the second side airbag.

2. The side airbag device of claim 1, wherein the first gas emission section and the second gas emission section emit gas simultaneously.

3. The side airbag device of claim 1, wherein:
    a side frame configuring a framework of the seatback is provided inside the side section, the side frame including a sidewall section extending along a seat front-rear direction of the side frame in plan view and a front wall section extending from a front edge of the sidewall section toward the seat width direction inner side in plan view; and
    the gas generation device is attached to the front wall section.

4. The side airbag device of claim 1, wherein:
    the gas generation device is formed in a circular cylinder shape having an axial direction oriented in the seat width direction so as to span into the first side airbag and the second side airbag;
    the first gas emission section is formed at one axial direction end of the gas generation device and is positioned inside the first side airbag; and
    the second gas emission section is formed at another axial direction end of the gas generation device and is positioned inside the second side airbag.

5. The side airbag device of claim 1, wherein:
    the gas generation device is formed in a circular cylinder shape having an axial direction oriented in a direction inclined with respect to the seat width direction when viewed along a seat front-rear direction so as to span into the first side airbag and the second side airbag;

the first gas emission section is formed at one axial direction end of the gas generation device and is positioned inside the first side airbag; and the second gas emission section is formed at another axial direction end of the gas generation device and is positioned inside the second side airbag.

6. The side airbag device of claim 5, wherein the gas generation device is inclined with respect to the seat width direction such that the first gas emission section is at a position at a seat lower side of the second gas emission section.

7. The side airbag device of claim 1, wherein:

the first side airbag extends to a seat lower side of the second side airbag; and a lower portion of the first side airbag is enlarged toward the seat width direction inner side so as to tuck under a lower side of the second side airbag.

8. The side airbag device of claim 1, wherein the first side airbag and the second side airbag are formed with similar sizes.

9. The side airbag device of claim 5, wherein the axial direction of the gas generation device is inclined at an acute angle with respect to the seat vertical direction.

* * * * *